United States Patent
Yamazaki et al.

(10) Patent No.: US 10,490,357 B2
(45) Date of Patent: Nov. 26, 2019

(54) FILM CAPACITOR, COMBINATION TYPE CAPACITOR, INVERTER, AND ELECTRIC VEHICLE

(71) Applicant: KYOCERA Corporation, Kyoto-shi, Kyoto (JP)

(72) Inventors: Youichi Yamazaki, Kirishima (JP); Yoshihiro Nakao, Katano (JP)

(73) Assignee: KYOCERA CORPORATION, Kyoto-shi, Kyoto (JP)

( * ) Notice: Subject to any disclaimer, the term of this patent is extended or adjusted under 35 U.S.C. 154(b) by 0 days.

(21) Appl. No.: 15/761,890

(22) PCT Filed: Sep. 21, 2016

(86) PCT No.: PCT/JP2016/077794
§ 371 (c)(1),
(2) Date: Mar. 21, 2018

(87) PCT Pub. No.: WO2017/057122
PCT Pub. Date: Apr. 6, 2017

(65) Prior Publication Data
US 2018/0269002 A1    Sep. 20, 2018

(30) Foreign Application Priority Data

Sep. 28, 2015 (JP) ................. 2015-189901
Oct. 29, 2015 (JP) ................. 2015-213063

(51) Int. Cl.
*H01G 4/32* (2006.01)
*H01G 4/38* (2006.01)
(Continued)

(52) U.S. Cl.
CPC ............. *H01G 4/33* (2013.01); *B60K 6/28* (2013.01); *B60L 50/51* (2019.02); *H01G 4/32* (2013.01);
(Continued)

(58) Field of Classification Search
CPC .. H01G 4/32; H01G 4/33; H01G 4/18; H01G 9/048; H01G 13/02; H01G 4/005; H02M 7/5387; H02M 7/003; H02P 27/06
See application file for complete search history.

(56) References Cited

U.S. PATENT DOCUMENTS

| 4,866,407 A * | 9/1989 | Ikeda .................. H01F 30/08 |
| | | 333/184 |
| 7,911,765 B2 * | 3/2011 | Takeoka ................ H01G 4/01 |
| | | 361/301.5 |

(Continued)

FOREIGN PATENT DOCUMENTS

| EP | 1868217 A1 | 12/2007 |
| JP | 58-040830 U | 3/1983 |

(Continued)

OTHER PUBLICATIONS

International Search Report, PCT/JP2016/077794, dated Nov. 29, 2016, 2 pgs.

*Primary Examiner* — Nathan Milakovich
(74) *Attorney, Agent, or Firm* — Volpe and Koenig, P.C.

(57) ABSTRACT

A film capacitor includes a body including a core body formed of an insulating material and metalized films which are wound around the core body; and first and second terminal electrodes disposed on both end surfaces in an axial direction of the body, respectively, a cross section perpendicular to an axial direction, i.e., z direction, of the core body having an oval outer periphery having a major axis and a minor axis, and an inner periphery defining a slit extending along the major axis. The provision of the core body makes it possible to suppress loosening of the metalized films or occurrence of a gap between the metalized films, thus making the film capacitor having a high insulation property.

15 Claims, 6 Drawing Sheets

(51) Int. Cl.
*H01G 4/40* (2006.01)
*H01G 9/048* (2006.01)
*H02M 7/00* (2006.01)
*H02M 7/5387* (2007.01)
*H01G 4/33* (2006.01)
*B60K 6/28* (2007.10)
*H02P 27/06* (2006.01)
*B60L 50/51* (2019.01)
*H01G 13/02* (2006.01)
*H01G 4/18* (2006.01)
*H01G 4/005* (2006.01)

(52) U.S. Cl.
CPC ............... *H01G 4/38* (2013.01); *H01G 4/40* (2013.01); *H01G 9/048* (2013.01); *H02M 7/003* (2013.01); *H02M 7/5387* (2013.01); *H02P 27/06* (2013.01); *H01G 4/005* (2013.01); *H01G 4/18* (2013.01); *H01G 13/02* (2013.01); *Y02T 10/642* (2013.01); *Y02T 10/7005* (2013.01)

(56) References Cited

U.S. PATENT DOCUMENTS

| | | | |
|---|---|---|---|
| 8,481,198 B2* | 7/2013 | Ohashi | H01G 9/151 |
| | | | 429/122 |
| 9,390,876 B2* | 7/2016 | Otera | H01L 41/0986 |
| 2006/0208660 A1* | 9/2006 | Shinmura | H02M 7/003 |
| | | | 315/209 R |

FOREIGN PATENT DOCUMENTS

| | | | | |
|---|---|---|---|---|
| JP | 59-036922 A | | 2/1984 | |
| JP | 64-055816 A | | 3/1989 | |
| JP | 10303058 A | * | 11/1998 | |
| JP | 11-354388 A | | 12/1999 | |
| JP | 2003-109869 A | | 4/2003 | |
| JP | 2005093761 A | * | 4/2005 | ............... H01G 4/32 |

\* cited by examiner

FILM CAPACITOR, COMBINATION TYPE CAPACITOR, INVERTER, AND ELECTRIC VEHICLE

TECHNICAL FIELD

The present invention relates to a film capacitor, a combination type capacitor, an inverter and an electric vehicle.

BACKGROUND ART

In a film capacitor, for example, a capacitor body (hereinafter, referred to as "body") is formed by winding, around a metallic winding core, a metalized film having a dielectric film in which a polypropylene resin is formed into a film and an electrode film formed on a surface of the dielectric film by vapor deposition (for example, see Patent Literature 1), and on each end portion in an axial direction of the body, an electrode terminal formed of a metalicon is provided.

In such a film capacitor, the metallic winding core is used as it is without being removed. Since the metallic winding core has excellent thermal conduction and is high in thermal strength and mechanical strength, heat dissipation is excellent, the metalized film is less loose or deformed even when used at comparatively high temperature, the use of a large-diameter winding core is easy, and a metalized film with high hardness can be wound.

Moreover, in film capacitors of recent years, the capacity and size per film capacitor element have increased with the aim of production efficiency and material loss reduction, and film capacitors having an oval cross section which capacitors are flattened with the aim of saving space are used frequently. For such oval film capacitors, normally, a cylindrical winding core is used, and flattening is performed together with the element without the winding core removed.

CITATION LIST

Patent Literature

Patent Literature 1: Japanese Unexamined Patent Publication JP-A 64-55816 (1989)

SUMMARY OF INVENTION

A film capacitor of the present disclosure comprises: a body including a core body formed of an insulating material and a metalized film which is wound around the core body; and first and second terminal electrodes disposed on both end surfaces in an axial direction of the body, respectively, a cross section perpendicular to an axial direction of the core body having an oval outer periphery having a major axis and a minor axis, and an inner periphery defining a slit extending along the major axis.

A combination type capacitor of the present disclosure comprises: a plurality of the film capacitors mentioned above; and at least one bus bar connecting all of the plurality of the film capacitors.

An inverter of the present disclosure comprises: a bridge circuit including switching elements; and a capacitance member connected to the bridge circuit, the capacitance member including the film capacitor or the combination type capacitor mentioned above.

An electric vehicle of the present disclosure comprises: a power source; the inverter mentioned above, the inverter being connected to the power source; a motor connected to the inverter; and a wheel driven by the motor.

BRIEF DESCRIPTION OF DRAWINGS

FIGS. 1A to 1C schematically show the structure of a film capacitor that is oval in transverse cross section, wherein FIG. 1A is a side view, FIG. 1B is a development perspective view, and FIG. 1C is a transverse cross-sectional view of a core body;

FIGS. 2A to 2C schematically show the film capacitor according to a first embodiment, wherein FIG. 2A is a transverse cross-sectional view of a body, FIG. 2B is a transverse cross-sectional view explaining the dimensions of the core body, and FIG. 2C is a perspective view of the core body;

FIGS. 4A to 4D schematically show the film capacitor according to the first embodiment, wherein FIG. 4A is a y-z longitudinal cross-sectional view of the body, FIG. 4B is an x-z longitudinal cross-sectional view of a modified example, FIG. 4C is a perspective view of the core body of FIG. 4B, and FIG. 4D is a side view showing an end surface of the core body of another modified example;

FIGS. 5A to 5C schematically show the film capacitor according to a second embodiment, wherein FIG. 5A is a transverse cross-sectional view of a body, FIG. 5B is a transverse cross-sectional view explaining the dimensions of the core body, and FIG. 5C is a perspective view of the core body;

FIGS. 8A to 8C schematically show the film capacitor according to the second embodiment, wherein FIGS. 8A and 8B are y-z longitudinal cross-sectional views of the body, and FIG. 8C is a perspective view of the core body of FIG. 8B;

DESCRIPTION OF EMBODIMENTS

Figure 1A:
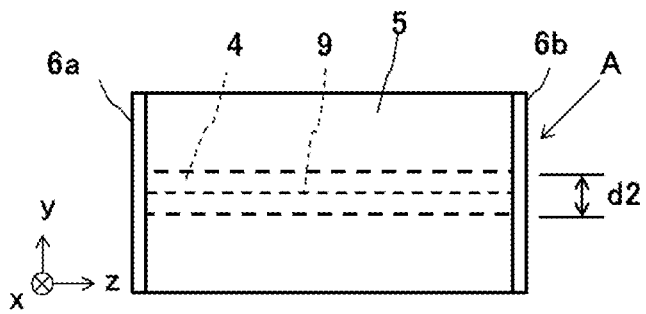
Figure 1B:
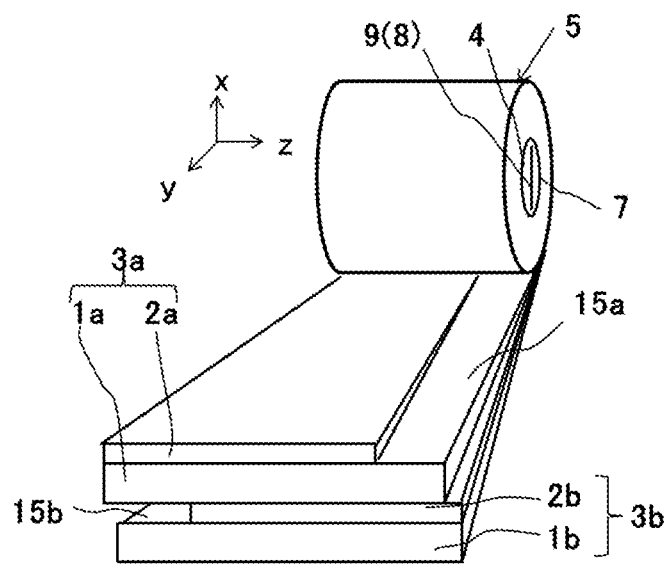
Figure 1C:
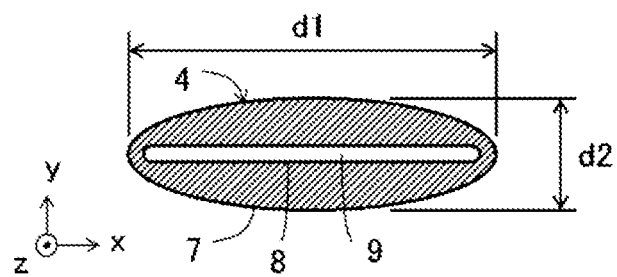

FIGS. 1A to 1C schematically show an example of the structure of a film capacitor A that is oval in transverse cross section, wherein FIG. 1A is a side view, FIG. 1B is a development perspective view, and FIG. 1C is a transverse cross-sectional view of a core body. In each figure, xyz coordinate axes are added for ease of explanation.

As shown in FIG. 1A, the film capacitor A comprises a body 5, a first terminal electrode 6a and a second terminal electrode 6b. In the body 5, metalized films 3a and 3b are placed one on another as shown in FIG. 1B and wound around a core body 4 made of an insulating material. The metalized film 3a is provided with an electrode film 2a on one surface of a dielectric film 1a, and the metalized film 3b is provided with an electrode film 2b on one surface of a dielectric film 1b.

As shown in FIG. 1A, the first terminal electrode 6a is located on one end surface of the body 5 in an axial direction (z direction) of the core body 4, and the second terminal electrode 6b is located on the other end surface thereof. The first terminal electrode 6a is electrically connected to the electrode film 2a, and the second terminal electrode 6b is electrically connected to the electrode film 2b.

Although in FIG. 1B, in order to make it easy to see the structure of the film capacitor A, the thicknesses of the dielectric films 1a and 1b and the electrode films 2a and 2b are shown so as to increase from the back toward the front of FIG. 1B, these thicknesses are constant in actuality. Moreover, in FIG. 1B, the first and second terminal electrodes 6a and 6b are omitted.

The metalized film 3a has, on one surface of the dielectric film 1a, a part having the electrode film 2a and a part 15a where the dielectric film 1a is exposed (hereinafter, referred to as "dielectric film exposed part"). The dielectric film exposed part 15a is provided so as to be continuous, in the length direction, with the side of one end portion in the width direction (z direction) of the metalized film 3a. The metalized film 3b has, on one surface of the dielectric film 1b, a part having the electrode film 2b and a part where the dielectric film 1b is exposed (hereinafter, referred to as "dielectric film exposed part") 15b. The dielectric film exposed part 15b is provided so as to be continuous, in the length direction, with the side of one end in the width direction (z direction) of the metalized film 3b.

The metalized films 3a and 3b are placed one on another so that the dielectric film exposed parts 15a and 15b are located on the different sides in the width direction (z direction) of the metalized films 3a and 3b. Moreover, the metalized films 3a and 3b are placed one on another in a shifted state so that the other end portions in the width direction (z direction) protrude in the width direction (z direction). The other end portion of the metalized films 3a has the electrode film 2a and the other end portion of the metalized films 3b has the electrode film 2b. That is, in the body 5, the metalized films 3a and 3b are wound so as to be laminated around the core body 4 as shown in FIG. 1B.

In the core body 4, as shown in FIG. 1C, the cross section perpendicular to the axial direction (z direction) (hereinafter, sometimes referred to as "transverse cross section") has an oval outer periphery 7 and an inner periphery 8. The outer periphery 7 has a major axis d1 and a minor axis d2. The inner periphery 8 defines a slit 9 extending along the major axis d1. The slit 9 is a narrow gap (i.e. a slit, a cut) of the core body 4 defined inside the inner periphery 8.

Normally, a metallic cylinder has been used as the core body. However, the metallic core body is extremely difficult to process since the mechanical strength thereof is too high, and there is concern that the metalized films 3a and 3b are damaged at the time of flattening. In particular, when a cylindrical core body is used, there are cases where the core body is locally bent by the flattening to loosen the metalized films 3a and 3b and cause a gap between the metalized films 3a and 3b. If metalicon electrodes are formed as the first and second terminal electrodes 6a and 6b under a condition where there is a gap between the metalized films 3a and 3b as described above, there is concern that the metalicon enters the gap to cause short-circuiting.

First Embodiment

Figure 2A:
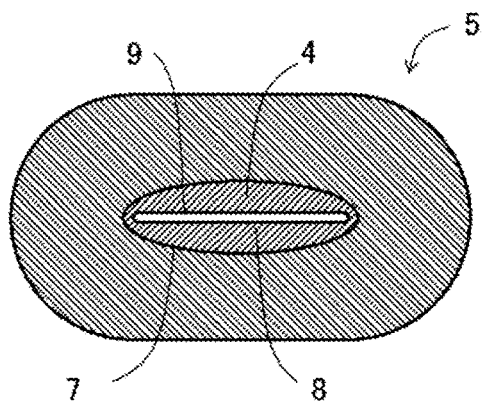
Figure 2B:
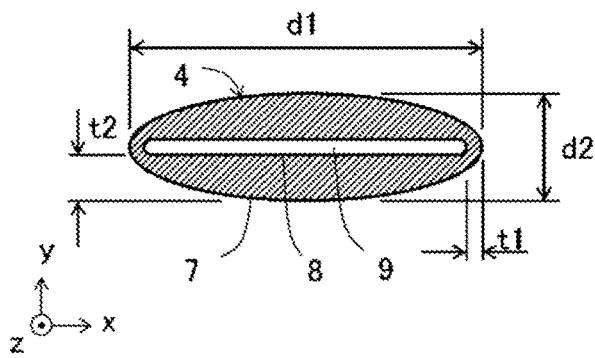
Figure 2C:
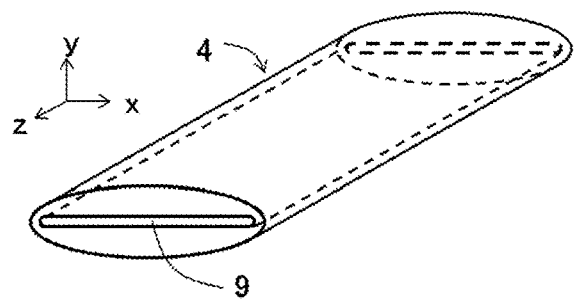

In the present embodiment, as shown in FIGS. 2A and 2B, the transverse cross section of the core body 4 has the oval outer periphery 7 and the inner periphery 8 defining the slit 9 extending along the major axis. Here, the major axis of the oval coincides with the x direction, the minor axis thereof coincides with the y direction, the length of the major axis is d1, and the length of the minor axis is d2. FIG. 2C is a perspective view of the core body 4.

Although the oval outer periphery 7 indicates a shape where a point (x, y) on the outer periphery 7 satisfies a relational expression (1): $x^2/r1^2 + y^2/r2^2 = 1$ when the point of intersection of the major axis and the minor axis is the origin point, the length of the semimajor axis is r1 (=d1/2) and the length of the semiminor axis is r2 (=d2/2), in the present disclosure, it is necessary only that the outer periphery 7 be composed of a curved line having a convex form. For example, a structure satisfying a relational expression (2): $x^3/r1^3 + y^3/r2^3 = 1$ and a relational expression (3): $x^4/r1^4 + y^4/r2^4 = 1$ may be adopted.

By forming the outer periphery 7 of the transverse cross section of the core body 4 in an oval shape, the local bend of the core body 4 and the metalized films 3a and 3b and the loosening of the metalized films 3a and 3b are suppressed, so that a gap is less prone to occur between the metalized films 3a and 3b. As a consequence, the metalicon which is a constituent material of the first and second terminal electrodes 6a and 6b is less prone to enter the gap between the metalized films 3a and 3b, so that a film capacitor A with a low short-circuiting occurrence rate and high insulation property can be obtained. Such a shape of the transverse cross section of the core body 4 is checked, for example, by performing image processing on a picture of the transverse cross section of the core body 4.

Figures 3A, 3B:
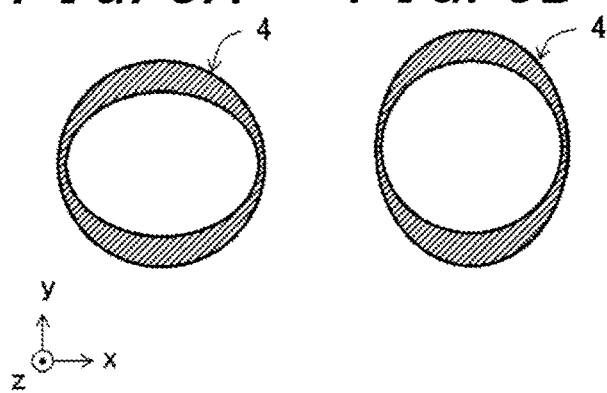
FIGS. 3A and 3B are cross-sectional views showing an example of a core element of the first embodiment.

Such a film capacitor A is produced, for example, as follows. As the core element of the core body 4, a tubular element is prepared in which the thickness in the x direction on the transverse cross section is smaller than the thickness in the y direction. As the transverse cross section of the core element, for example, a cross section having a circular outer periphery and an oval inner periphery as shown in FIG. 3A or a cross section having an oval outer periphery and a circular inner periphery as shown in FIG. 3B is used.

As the material of the core element, an insulating organic resin material is used. Specifically, examples of the organic resin material include polypropylene (PP), polyacetal (POM), polyamide (PA), polyethylene terephthalate (PET), polyphenylene sulfide (PPS), polytetrafluoroethylene (PTFE) and polyetheretherketone (PEEK). Such an organic resin material is easily formed into a desired shape as the core element and can be easily flattened without any damage to the films.

Around the core element, the above-described metalized films 3a and 3b are wound so as to be laminated, thereby obtaining a wound body. At this time, the metalized films 3a and 3b are wound so as to be laminated in a state of being shifted from each other in the film width direction (z direction).

The body 5 which is the obtained wound body is pressed together with the core element, and flattened into a shape as shown in FIG. 2A. At this time, by setting the pressing direction to the y direction in which the thickness of the core element is large, the core element is formed into the core body 4 having the oval outer periphery 7 the transverse cross section of which has the major axis d1 and the minor axis d2 and the inner periphery 8 defining the slit 9 extending along the major axis d1. The slit 9 referred to here is the narrow gap between the closely adjoining parts of the inner periphery 8, and is separated from the outer periphery 7.

The entire outer periphery 7 of such a core body 4 is composed of a curved line that is convex in the radial direction. Moreover, as shown in FIG. 2B, the thickness in the direction of the major axis of the transverse cross section is smaller than the thickness in the direction of the minor axis. The thickness t1 in the direction of the major axis is the thickness between the outer periphery 7 in the x direction and the slit 9. The thickness t2 in the direction of the minor axis is the thickness between the outer periphery 7 in the y direction and the slit 9. By setting t1 to be smaller than t2, when the body 5 is pressed, the core element is largely deformed at the part where the thickness is small (t1), and there is no large deformation at a part of the core element in which the thickness is large (t2). By using such a core body 4, the loosening of the metalized films 3a and 3b due to the local bend of the core body 4 and the occurrence of a gap between the metalized films 3a and 3b can be suppressed, so that a film capacitor A with high insulation property is obtained.

In particular, by using as the core element an element having a circular outer periphery and an oval inner periphery (see FIG. 3A) and using an oval winding core axis at the time of lamination winding, winding can be easily performed without the core element idling.

The ratio between the lengths of the major axis d1 and the minor axis d2 of the core body 4 is set in a range of 0.05 to 0.5 in a ratio (d2/d1). By setting (d2/d1) to not less than 0.05, the thickness of the core body 4 is secured, so that an effect of improving the dimension accuracy at the time of flattening is obtained. Moreover, by setting (d2/d1) to not more than 0.5, it is possible to suppress the volume of the core body 4 to a small extent, so that space saving of the element can be realized.

Figure 4A:
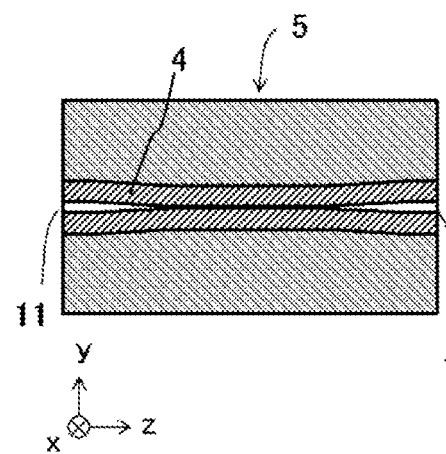
Figure 4B:
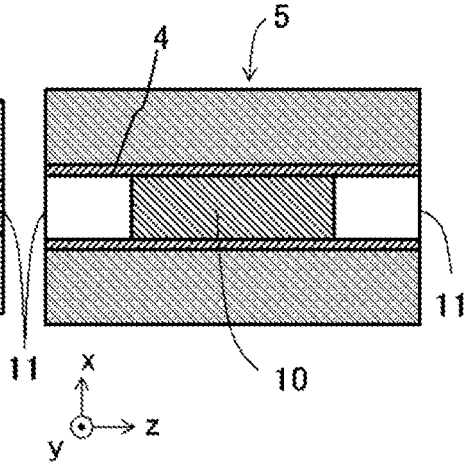

FIG. 4A is a cross-sectional view of the body 5 viewed from the x-axis direction, and FIG. 4B is a cross-sectional view of the body 5 viewed from the y direction. With respect to the inner periphery 8 of the transverse cross section of the core body 4, preferably, as shown in FIG. 4A, at least in the neighborhood of the center in the axial direction (z direction), parts of the inner periphery 8 opposing each other in the minor axis direction (y direction) abut to close the slit 9. Alternatively, preferably, as shown in FIG. 4B, an insulating member 10 is disposed at least in the neighborhood of the center in the axial direction (z direction) in the slit 9 to close the slit 9.

Figure 4C:
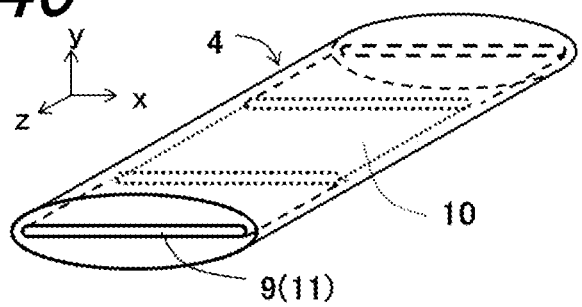

FIG. 4C is a perspective view of the core body 4 shown in FIG. 4B. the gap of the slit 9 does not communicate in the axial direction (z direction) of the core body 4 by causing parts of the inner periphery 8 to abut at least in the neighborhood of the center in the axial direction (z direction) or by the insulating member 10 being disposed at least in the neighborhood of the center in the axial direction (z direction) in the slit 9. Consequently, the conduction between the first terminal electrode 6a and the second terminal electrode 6b through the gap of the slit 9 can be suppressed by the metalicon processing, so that the short-circuiting occurrence rate can be reduced.

A part of the core body in which the slit 9 is closed (hereinafter, referred to as "slit closed part") is not limited to the neighborhood of the center in the axial direction (z direction). The slit closed part may be disposed in the neighborhood of either end portion in the axial direction (z direction) as long as the slit 9 is disposed so as not to communicate in the axial direction (z direction). Moreover, the slit closed part may be disposed so as to be divided in a plurality of positions in the axial direction (z direction).

Figure 4D:
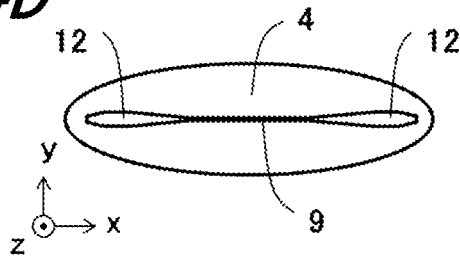

Both end portions in the axial direction (z direction) of the core body 4 are preferably provided with openings 11 defined by the slit 9 as shown in FIGS. 4A and 4B. By providing both end portions of the core body 4 with the openings 11, the metalicon enters the openings 11a when an external electrode is formed, so that an anchor effect is obtained. By this anchor effect, an effect of improving the strength of joint between the body 5 and the first and second terminal electrodes 6a and 6b is obtained. The openings 11 do not penetrate in the axial direction (z direction), that is, the openings 11 located at both end portions are not connected with each other. That is, as shown in FIG. 4D, preferably, at both end portions in the axial direction (z direction) of the core body 4, the slit 9 has the openings 11 only at the end portions in the major axis direction (x direction) thereof and is closed in the neighborhood of the center in the major axis direction (x direction).

Second Embodiment

Figure 5A:
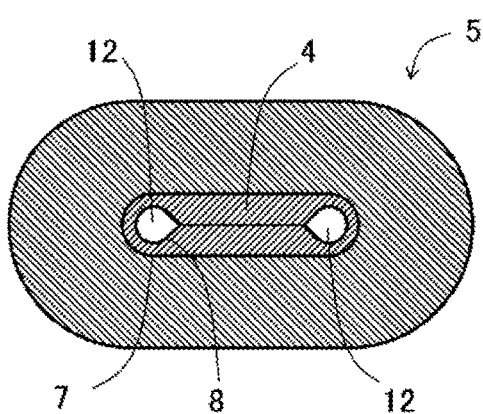
Figure 5B:
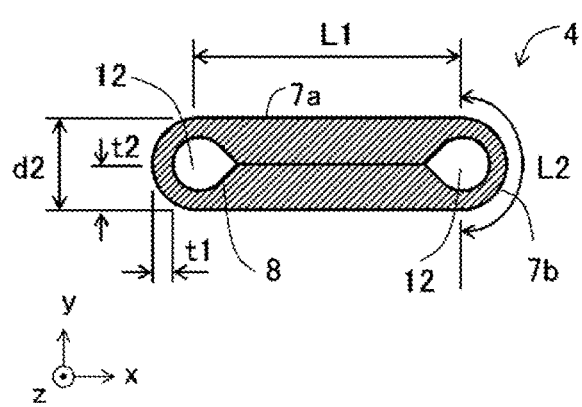
Figure 5C:
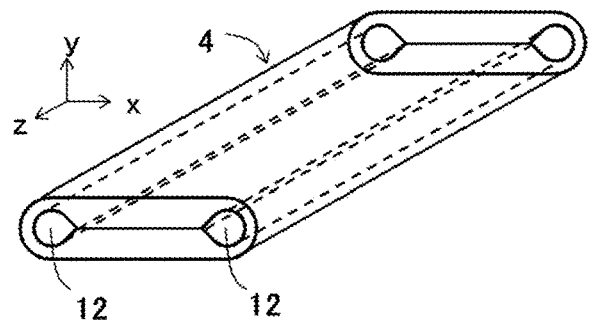

In the present embodiment, as shown in FIGS. 5A and 5B, the cross section perpendicular to the axial direction (z direction) (hereinafter, sometimes referred to as "transverse cross section") of the core body 4 has an outer periphery 7 provided with a pair of straight long sides 7a and a pair of short sides 7b and an inner periphery 8 defining a slit extending along the long sides 7a inside the outer periphery 7. Here, the direction parallel to the long sides 7a is the x direction, the direction perpendicular to the long sides 7a is the y direction, the length of the long sides 7a is L1, and the length of the short sides 7b is L2 (see FIG. 5B). The slit defined by the inner periphery 8 extends along the long sides 7a and has a bulging portion 12 which is a gap at each end thereof in the x direction. FIG. 5C is a perspective view of the core body 4.

Hereinafter, the shape of the outer periphery 7 will be occasionally referred to as "corner-rounded rectangular shape". The corner-rounded rectangular shape indicates a rectangular shape which has a pair of long sides and a pair of short sides and corners of which are rounded. In the second embodiment, the long sides 7a are constituted by straight lines, and the short sides 7b connecting the opposed long sides 7a form an arc shape convex to the outside in the x direction.

Although the long sides 7a are straight, they may be slightly convex to the outside. Although the short sides 7b are preferably constituted by curved lines forming an arc convex to the outside, they may have straight parts. Although the opposed long sides 7a are preferably parallel to each other, they may be at a slight angle with each other. Although the lengths of the opposed long sides 7a are preferably the same, they may be different from each other. In the present embodiment, the outer periphery 7 has no parts which are concave to the inside.

By forming the outer periphery 7 of the transverse cross section of the core body 4 in a corner-rounded rectangular shape, the local bend of the core body 4 and the metalized films 3a and 3b and the loosening of the metalized films 3a and 3b are suppressed, so that a gap is less prone to occur between the metalized films 3a and 3b. As a consequence, the metalicon which is a constituent material of the first and second terminal electrodes 6a and 6b is less prone to enter the gap between the metalized films 3a and 3b, so that it is possible to obtain a film capacitor A with a low short-circuiting occurrence rate and high insulation property. The shape of the transverse cross section of such a core body 4 may be checked, for example, by performing image processing on a picture of the transverse cross section of the core body 4.

Figure 6:
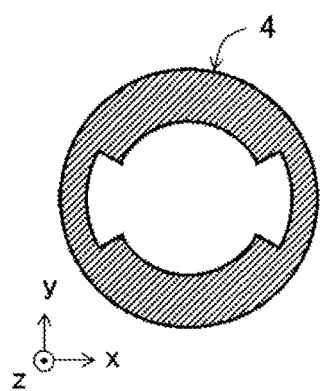
FIG. 6 is a cross-sectional view showing an example of a core element according to the second embodiment.
Figure 7A:
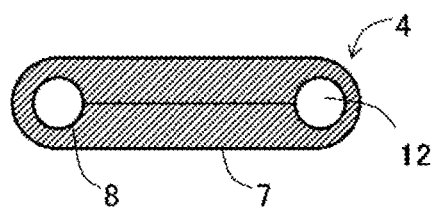
FIGS. 7A to 7D are transverse cross-sectional views showing modified examples of the core body according to the second embodiment.
Figure 7B:
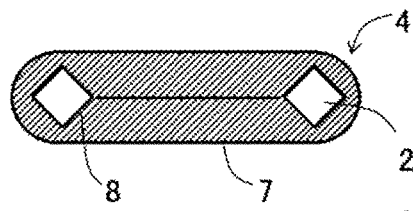
Figure 7C:
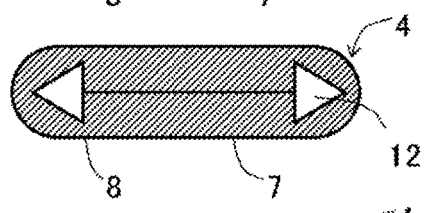
Figure 7D:
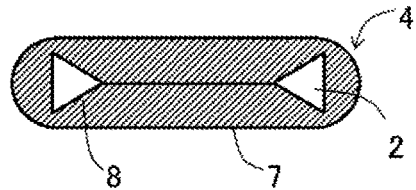

Such a film capacitor A can be produced, for example, as follows. As the core element of the core body 4, a tubular element is prepared in which the thickness in the x direction on the transverse cross section is smaller than the thickness in the y direction. As the transverse cross section of this core element, for example, a cross section having a circular outer periphery and an inner periphery the diameter of which differs between in the x direction and in the y direction as shown in FIG. 6 is used.

As the material of the core element, a material similar to that of the first embodiment may be used.

Around the core element, the metalized films 3a and 3b are wound so as to be laminated to obtain a wound body as in the first embodiment. The body 5 which is the obtained wound body is pressed together with the core element, and flattened into a shape as shown in FIG. 5A. At this time, by setting the pressing direction to the y direction in which the thickness of the core element is large, the core element is formed into the core body having the corner-rounded rectangular outer periphery 7 the transverse cross section of which is provided with a pair of straight long sides 7a and a pair of short sides 7b and the inner periphery 8 defining the slit 9 which extends along the long sides 7a and having a bulging portion 12 at each end thereof. The slit 9 referred to here indicates the narrow gap between the closely adjoining parts of the inner periphery 8, and is separated from the outer periphery 7.

The outer periphery 7 of such a core body 4 is, on the whole, composed of the pair of straight long sides 7a and the pair of short sides 7b. Moreover, as shown in FIG. 5B, the thickness of parts of the short sides 7b of the transverse cross section is smaller than the thickness at parts of the long sides 7a. The thickness t1 of parts of the short sides 7b of the transverse cross section is the thickness in the direction of the major axis. The thickness t2 at parts of the long sides 7a is the thickness in the direction of the minor axis. By adjusting t1 to be smaller than t2, when the body 5 is pressed, the core element is largely deformed at the parts in which the thickness is small (t1), and no large deformation occurs at the parts in which the thickness is large (t2). By using such a core body 4, it is possible to suppress the loosening of the metalized films 3a and 3b due to the local bend of the core body 4 and the occurrence of a gap between the metalized films 3a and 3b, so that a film capacitor A with high insulation property is obtained.

Moreover, on the transverse cross section of the core body 4, the bulging portions 12 form teardrop-shaped gaps having arcs extending along the short sides 7b. By forming the bulging portions 12 in such a teardrop shape, a core body 4 with a small local deformation can be obtained. In other words, when the body 5 which is a wound body is pressed to be flattened, by forming the bulging portions 12 which are tear-drop shape gaps in the parts in which the thickness of the core body 4 is small, the local deformation at the other parts in which the thickness is large (hereinafter, referred to merely as "local deformation of the core body 4") can be suppressed. By suppressing the local deformation of the core body 4 at the parts other than the bulging portions 12 as described above, it is possible to suppress the loosening of the metalized films 3a and 3b and the occurrence of a gap between the metalized films 3a and 3b (hereinafter, referred to merely as gap occurrence between the metalized films).

Although the shape of the transverse cross section of the bulging portions 12 is preferably a teardrop shape, it may be a shape as shown in FIGS. 7A to 7D (i.e. a circular or oval shape, a diamond shape, a triangular shape, etc.). Such a shape is obtained by designing the shape of the inner periphery of the core element so as to become a shape as mentioned above after pressing.

On the transverse cross section of the core body 4, the overall length of the outer periphery 7 of the core body 4 is L0, the length of the long sides 7a is L1, the length of the short sides 7b is L2, and the length in a direction perpendicular to the long sides 7a of the core body 4 is d2. The length d2 is a length of minor axis. The direction perpendicular to the long sides 7a is the y direction. At this time, it is preferable that a value P expressed as $P=(L2/L1)\times(L0/(\pi \cdot d2)-1)$ is in a range of 0.8 to 1.2, in particular, in a range of 0.9 to 1.1. P is the parameter related to the shape of the transverse cross section of the core body 4, and by setting P in this range, the local deformation of the core body 4 can be further suppressed. For example, when P is lower than 0.8, there is a tendency that the parts of the short sides 7b are largely deformed in the latter stage of pressing and the gap between the metalized films is likely to occur. Moreover, when P is higher than 1.2, there is a tendency that the boundary between the parts of the long sides 7a and the parts of short sides 7b is deformed in the initial stage of pressing and the gap between the films is likely to occur.

On the transverse cross section of the core body 4, the thickness t1 of the parts of the short sides 7b is preferably in a range of 0.2 to 0.3 in the ratio (t1/d2) to the length d2 in the direction perpendicular to the long sides 7a. The length d2 in the direction perpendicular to the long sides 7a is a length of a minor axis. The direction perpendicular to the long sides 7a is the y direction. By setting t1/d2 to be in the range of 0.2 to 0.3, the local deformation of the core body 4 can be further suppressed. For example, when t1/d2 is lower than 0.2, there is a tendency that the boundary between the parts of the long sides 7a and the parts of short sides 7b is deformed in the initial stage of pressing and the gap between the metalized films is likely to occur. Moreover, when t1/d2 is higher than 0.3, there is a tendency that the parts of the long sides 7a are deformed in the initial stage of pressing and the gap between the metalized films is likely to occur. It is particularly preferable that t1/d2 is in a range of 0.23 to 0.27.

Figures 8A, 8B:
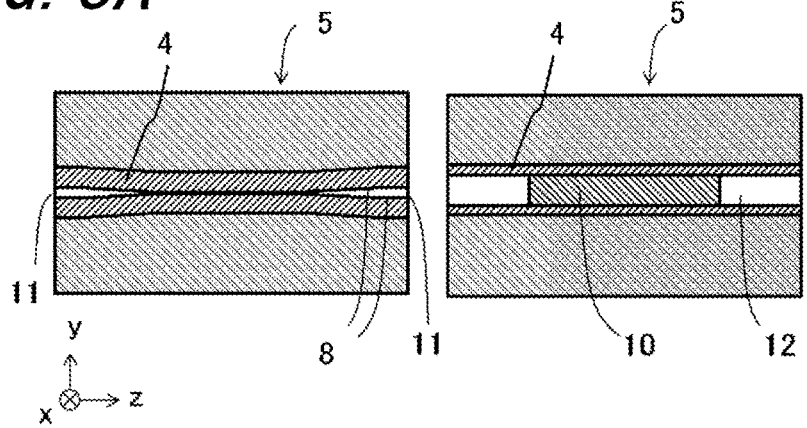

It is preferable that, in the inner periphery 8 of the transverse cross section of the core body 4, the parts of the inner periphery 8 opposing each other along the long sides 7a, that is, the parts of the inner periphery 8 opposing each other through the slit 9 abut to close the slit 9 as shown in FIGS. 5A to 5C. The parts of the inner periphery 8 opposing each other along the long sides 7a are parts situated between the two bulging portions 12. Although the opposed parts of the inner periphery 8 may abut over the entire portion in the axial direction (z direction), a structure may be adopted in which the opposed parts of the inner periphery 8 at least partially abut on each other in the axial direction (z direction) as shown in FIG. 8A. FIG. 8A is a cross-sectional view of the body 5 at the center in the x direction of the core body 4. In this case, it is necessary only that the gap of the slit 9 defined by the inner periphery 8 does not penetrate from one end to the other end in the axial direction (z direction). Since the opposed parts of the inner periphery 8 at least partially abut on each other in the z direction and the gap of the slit 9 is closed without penetrating from one end to the other end in the axial direction (z direction), even if the metalicon constituting the first and second terminal electrodes 6a and 6b enter the gap of the slit 9, the conduction between the first terminal electrode 6a and the second terminal electrode 6b through the gap of the slit 9 is suppressed, so that the short-circuiting occurrence rate can be reduced. The part in which the slit 9 is closed, that is, the slit closed part may be in the neighborhood of the center in the axial direction (z direction). Moreover, it may be in the neighborhood of either end portion in the axial direction (z direction) as long as the slit 9 is provided so as not to penetrate in the axial direction (z direction). Moreover, the slit closed part may be disposed so as to be divided in a plurality of positions in the axial direction (z direction).

At both ends in the axial direction (z direction), the openings 11 of the slit 9 defined by the inner periphery 8 may be present. The metalicon enters the openings 11 of the slit at the end portions in the axial direction (z direction), so that an anchor effect is obtained. By this anchor effect, an effect of improving the strength of joint between the body 5 and the first and second terminal electrodes 6a and 6b is obtained.

Figure 8C:
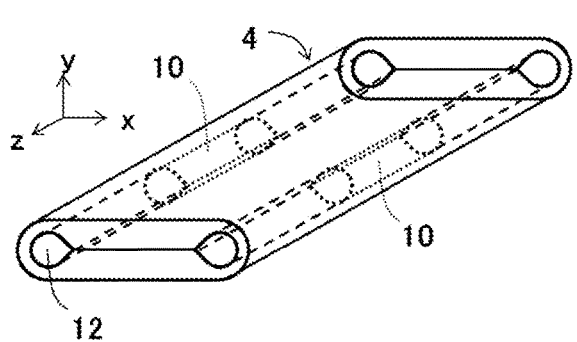

FIG. 8B is a cross-sectional view of the body 5 perpendicular to the x direction showing the bulging portions 12, and FIG. 8C is a perspective view of the core body 4 shown in FIG. 8B. Regarding the bulging portions 12, as shown in FIG. 8B, it is preferable that the insulating member 10 is disposed in the gaps of the bulging portions 12 so that the bulging portions 12 are closed. The gaps of the bulging portions 12 do not communicate from one end to the other end in the axial direction (z direction) by disposing the insulating member 10. Consequently, it is possible to suppress the conduction between the first terminal electrode 6a and the second terminal electrode 6b through the gaps of the bulging portions 12 by the metalicon processing, so that the short-circuiting occurrence rate can be reduced.

The insulating member 10 may be disposed over the entire part in the axial direction (z direction) in the gaps of the bulging portions 12. Moreover, the insulating member 10 may be at least partially disposed in the axial direction (z direction). The insulating member 10 may be disposed in the neighborhood of either end portion in the axial direction (z direction) as long as the insulating member 10 is disposed so that the gaps of the bulging portions 12 are closed without communicating from one end to the other end in the axial direction (z direction). Moreover, the insulating member 10 may be disposed so as to be divided in a plurality of positions in the axial direction (z direction).

At both ends in the axial direction (z direction), the gaps of the bulging portions 12 may be open. By making the gaps of the bulging portions 12 open at both end portions in the axial direction (z direction), the metalicon enters the gaps of the openings of the bulging portions 12 when an external electrode is formed, so that an anchor effect is obtained. By this anchor effect, an effect of improving the strength of joint between the body 5 and the first and second terminal electrodes 6a and 6b is obtained.

<Combination Type Capacitor, Inverter, and Electric Vehicle>

Figure 9:
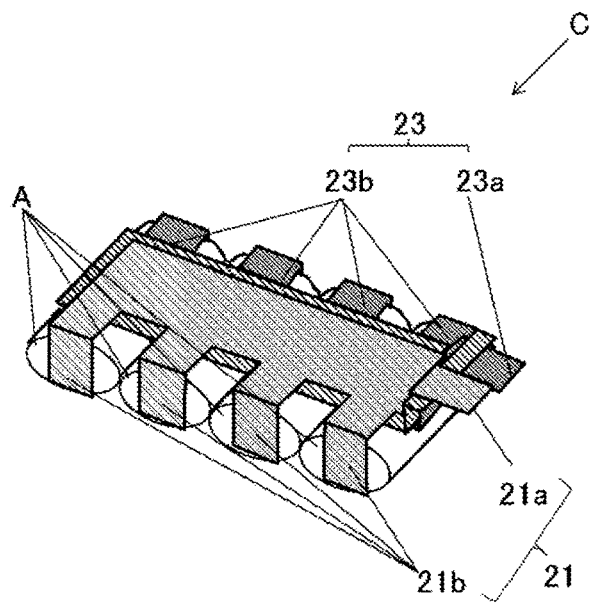
FIG. 9 is a perspective view schematically showing a combination type capacitor.

FIG. 9 is a perspective view schematically showing the structure of a combination type capacitor C. In FIG. 9, for ease in understanding of the configuration, the illustration of a case and a resin for molding is omitted. A combination type capacitor C has a configuration that a plurality of the film capacitors A are connected in parallel with each other by a pair of bus bars 21 and 23. The bus bars 21 and 23 are composed of external connection terminal portions 21a and 23a and extraction terminal portions 21b and 23b, and the extraction terminal portions 21b and 23b are connected to the external electrodes 6a and 6b of the film capacitor A, respectively.

When the above-described film capacitor A is applied to the combination type capacitor C, a combination type capacitor C with a low short-circuiting occurrence rate and high insulation property can be obtained.

Here, in addition to the planar arrangement as shown in FIG. 9, the combination type capacitor C may have a configuration that the film capacitors A are stacked together so that the flat faces thereof overlap with each other. Also in this configuration, a similar effect can be obtained. Moreover, a disposition in which the axial direction (z direction) may be arranged so as to extend along the vertical direction.

Figure 10:
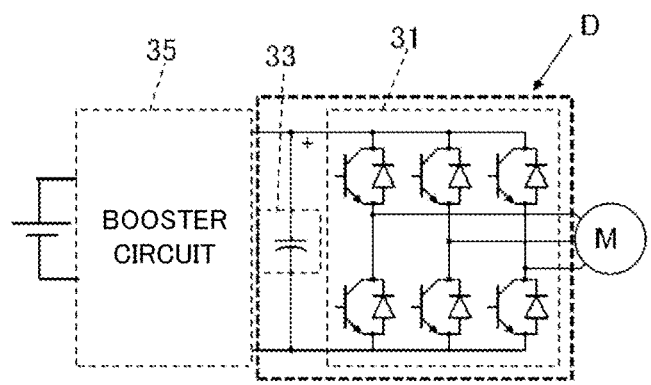
FIG. 10 is a schematic configuration diagram for explaining a configuration of an inverter.

FIG. 10 is a schematic configuration diagram for explaining a configuration of an inverter. FIG. 10 shows an example of an inverter D for generating alternating current from direct current. As shown in FIG. 10, the inverter D of the present embodiment has a configuration provided with a bridge circuit 31 and a capacitance member 33. The bridge circuit 31 includes switching elements (e.g., IGBTs (Insulated Gate Bipolar Transistors)) and diodes, and the capacitance member 33 is arranged between input terminals of the bridge circuit 31 for the purpose of voltage stabilization. In the present embodiment, the film capacitor A or the combination type capacitor C described above is employed as the capacitance member 33.

The inverter D is connected to a booster circuit 35 for boosting a voltage of a direct-current power supply. The bridge circuit 31 is connected to a motor generator (motor M) serving a driving source.

Figure 11:
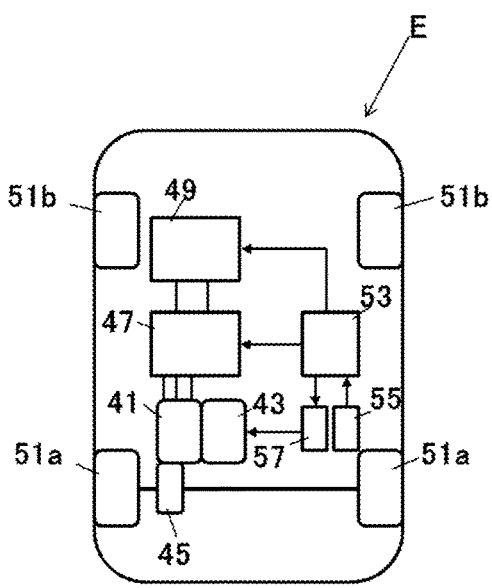
FIG. 11 is a schematic configuration diagram showing an electric vehicle.

FIG. 11 is a schematic configuration diagram showing an electric vehicle. FIG. 11 shows an example of a hybrid electric vehicle (HEV) serving as an electric vehicle E.

In FIG. 11, reference numeral 41 denotes an driving motor, reference numeral 43 denotes an engine, reference numeral denotes a transmission, reference numeral 47 denotes an inverter, reference numeral 49 denotes a power supply (battery), and reference numerals 51a and 51b denote a front wheel and a rear wheel, respectively.

The electric vehicle E is provided with an output from either or both of the electric motor 41 and the engine 43 serving as driving sources, and the output is transmitted to a pair of the right and left front wheels 51a through the transmission 45. The power supply 49 is connected to the motor 41 through the inverter 47.

Further, the electric vehicle E shown in FIG. 11 is provided with a vehicle ECU 53 for performing comprehensive control of the entire electric vehicle E. The vehicle ECU 53 receives driving signals inputted from the electric vehicle E in response to the operation of an ignition key 55, an accelerator pedal, a brake or the like. On the basis of the driving signals, the vehicle ECU 53 outputs instruction signals to an engine ECU 57, the power supply 49, and the inverter 47 serving as a load. In response to the instruction signals, the engine ECU 57 controls the revolution rate of the engine 43 to drive the electric vehicle E.

In a case where the inverter D applying as the capacitance member 33 the film capacitor A or the combination type capacitor C mentioned above is employed as, for example, the inverter 47 for the electric vehicle E as shown in FIG. 11, since the film capacitor A or the combination type capacitor C is low in short-circuiting occurrence rate and high in insulation property, it is possible to make the current control by the control devices such as ECUs mounted on the electric vehicle E more stable.

In addition to the above-mentioned hybrid electric vehicle (HEV), the inverter D of the present embodiment is applicable to various power conversion application products such as an electric vehicle (EV), a fuel cell vehicle, an electric bicycle, an electric generator, and a solar battery.

EXAMPLES

Using polyarylate (U-100, manufactured by Unitika Ltd.), a dielectric film with an average thickness of 2.5 µm was prepared. Polyarylate was dissolved in toluene, and the resin solution was applied onto a base material made of polyethylene terephthalate (PET) by using a coater and formed into a sheet. The formed resin sheet was subjected to heat treatment at 130° C. to remove toluene, thereby obtaining a dielectric film.

The obtained dielectric film was separated from the base material and slitted to a width of 140 mm, and then, on one principal surface of the dielectric film, an Al metallic film with a width of 107 mm was formed as an electrode film by a vacuum deposition method by using a metal mask, thereby obtaining a metalized film. The thickness of the metallic film was 70 nm, and the sheet resistance was 8.0Ω/□. The film thickness of the metallic film was obtained by a scanning electron microscope (SEM) observation of the ion-milled cross section. The sheet resistance (Rs) was calculated by an expression Rs=R×w/l by measuring the resistance value (R) across the metallic film with a width (w) of 10 mm and a length (l) of 300 mm by a two-terminal method.

The metalized film with a width of 140 mm was further slitted into a metalized film with a width of 55 mm having margin parts of 1.5 mm (dielectric film exposed parts).

As the core elements, elements having cross-sectional shapes as shown in FIG. 3A and FIG. 6, respectively, and formed of polypropylene (PP) with a length of 55 mm were prepared. That is, the following were prepared: an element having such a cross-sectional shape that the outer periphery was circular and the inner periphery was oval (FIG. 3A); and an element having such a cross-sectional shape that the outer periphery was circular, the thickness in the x direction was small and the thickness in the y direction was large (FIG. 6).

A pair of metalized films with a width of 55 mm were wound so as to be laminated on the core element so that the electrode films oppose the dielectric film in between, thereby forming a wound body. The pair of metalized films were made in a state of being shifted by 0.5 mm from each other in the width direction (z direction) and were wound with the margin parts disposed on the different sides in the width direction (z direction). The number of times of winding was 642, and a wound body with an outer diameter of 12.5 mm and a width of 55.5 mm (both were average values) was obtained.

The obtained wound body was flattened into film capacitor body by being pressed together with the core element. The pressing was performed under a condition that the temperature was 120° C. and the press load was 500 gf. Moreover, for comparison, film capacitors using a core element with a constant thickness (sample Nos. 1 and 2) and a film capacitor flattened with the core element being removed (sample No. 3) were also made. Regarding the core elements having the transverse cross sections shown in FIG. 3A and FIG. 6, the pressing direction was the y direction in which the thickness of the core element is large.

After the flattening, the gaps (slits) at the end portions of the core element were sealed by polyimide tape. Thereafter, a metalicon electrode which was a terminal electrode was formed by spraying an alloy of zinc and tin to the opposed end surfaces of the film capacitor body in which the electrode film was exposed, thereby forming a film capacitor.

The central portions in the width direction (z direction) of the obtained film capacitors were cut by using a diamond wire saw, and the transverse cross-sectional shapes of the core elements were checked. In the film capacitor using the core element having the cross-sectional shape shown in FIG. 3A, the outer periphery was oval and the inner periphery defined a slit extending along the major axis.

In the film capacitor using the core element having the cross-sectional shape shown in FIG. 6, the outer periphery had a corner-rounded rectangular shape and the inner periphery had a shape having teardrop-shaped bulging portions at both ends of the slit. In the film capacitor using the core element having a constant thickness, a locally concaved part was formed in the neighborhood of the center of the part corresponding to the major axis of the outer periphery and no oval outer periphery was possessed. Moreover, the inner periphery also had such a shape that two oval gaps were located side by side.

Regarding the first embodiment, that is, the samples in which the outer periphery of the core element had an oval shape, the major axis d1, the minor axis d2, the ratio d2/d1, the thickness t1 in the direction of the major axis and the thickness t2 in the direction of the minor axis of the transverse cross section of the core body were checked, and are shown in Table 1 (see FIG. 2B).

Regarding the second embodiment, that is, the samples where the outer periphery of the core body had a corner-rounded rectangular shape, the parameter P related to the shape of the transverse cross section of the core body and the ratio (t1/d2) between the thickness t1 of the short sides and the length d2 in a direction perpendicular to the long sides were checked, and are shown in Table 2. Here, P=(L2/L1)×(L0/π·d2)−1) wherein L1 denotes the length of the long sides of the outer periphery, L2 denotes the length of the short sides of the outer periphery, L0 denotes the overall length of the outer periphery, and d2 denotes the length of the core body in a direction perpendicular to the long sides, that is, the length of the minor axis (see FIG. 5B).

These numerical values related to the shape of the cross section corresponding to the core were obtained by performing image analysis, by using image processing software, on an image of the transverse cross section of the core body taken by a digital camera.

The short-circuiting occurrence rates and the break down voltages (BDVs) of the produced film capacitors were evaluated. For the short-circuiting occurrence rates, the resistances of the film capacitors were measured by using a multimeter, wherein the resistances of not more than 1 kΩ were regarded as short-circuiting, and the rates thereof were obtained. For the break down voltages (BDVs), a voltage boosting test in which direct current was applied to the film capacitors from 0 V at a voltage boosting speed of 10 V per second was performed, and the break down voltages were obtained from the voltage values immediately before the capacitance decreases by not less than 5% with respect to the value at 0 V (initial value). The initial value of the capacitance was measured under a condition of AC 10 V and 1 kHz before the voltage boosting test was performed. The average value of the initial values of the capacitance was 17.7 pF. Moreover, in the voltage boosting test, the following was repeated: at the time of the short-circuiting, that is, when the leakage current value exceeded 1.0 mA, the direct current voltage was once returned to 0 V, the capacitance was measured under the condition of AC 10 V and 1 kHz, and if the value was not less than 95% of the initial value, the voltage boosting test was again performed from 0 V.

The short-circuiting occurrence rates and the break down voltages (BDVs) of the film capacitors are shown in Table 1 and Table 2. Values other than the short-circuiting occurrence rate are the average values of n=50.

TABLE 1

| Sample No. | d1 mm | d2 mm | d2/d1 | t1 mm | t2 mm | Short-circuiting occurrence rate % | Break down voltage V |
|---|---|---|---|---|---|---|---|
| 1 | 10.0 | 2.5 | 0.25 | 1.0 | 1.0 | 16 | 800 |
| 2 | 10.0 | 5.0 | 0.5 | 2.0 | 2.0 | 16 | 800 |
| 3 | — | — | — | — | — | 24 | 700 |
| 4 | 10.0 | 0.5 | 0.05 | 0.25 | 0.15 | 10 | 1200 |
| 5 | 10.0 | 1.0 | 0.1 | 0.50 | 0.20 | 6 | 1250 |
| 6 | 10.0 | 2.0 | 0.2 | 1.00 | 0.50 | 2 | 1300 |
| 7 | 10.0 | 3.0 | 0.3 | 1.50 | 0.50 | 6 | 1200 |
| 8 | 10.0 | 4.0 | 0.4 | 2.00 | 0.50 | 10 | 1150 |
| 9 | 10.0 | 5.0 | 0.5 | 2.50 | 0.50 | 12 | 1100 |

TABLE 2

| Sample No. | t1 mm | t2 mm | P*[1] | t1/d2 | Short-circuiting occurrence rate % | Break down voltage V |
|---|---|---|---|---|---|---|
| 10 | 0.5 | 1.0 | 0.61 | 0.25 | 8 | 900 |
| 11 | 0.5 | 1.0 | 0.81 | 0.25 | 6 | 1000 |
| 12 | 0.5 | 1.0 | 1.00 | 0.25 | 2 | 1100 |
| 13 | 0.5 | 1.0 | 1.20 | 0.25 | 4 | 1050 |
| 14 | 0.5 | 1.0 | 1.37 | 0.25 | 10 | 950 |
| 15 | 1.0 | 2.0 | 0.62 | 0.25 | 6 | 850 |
| 16 | 1.0 | 2.0 | 0.82 | 0.25 | 2 | 1000 |
| 17 | 1.0 | 2.0 | 1.00 | 0.25 | 0 | 1050 |
| 18 | 1.0 | 2.0 | 1.16 | 0.25 | 4 | 1050 |
| 19 | 1.0 | 2.0 | 1.36 | 0.25 | 10 | 1000 |
| 20 | 0.3 | 1.0 | 1.00 | 0.15 | 6 | 950 |
| 21 | 0.4 | 1.0 | 1.00 | 0.20 | 2 | 1000 |
| 22 | 0.6 | 1.0 | 1.00 | 0.30 | 4 | 1100 |
| 23 | 0.7 | 1.0 | 1.00 | 0.35 | 8 | 1000 |
| 24 | 0.6 | 2.0 | 1.00 | 0.15 | 10 | 950 |
| 25 | 0.8 | 2.0 | 1.00 | 0.20 | 4 | 1000 |
| 26 | 1.2 | 2.0 | 1.00 | 0.30 | 2 | 1100 |
| 27 | 1.4 | 2.0 | 1.00 | 0.35 | 12 | 950 |

*[1]P = (L2/L1) × (L0/(π · d2) − 1)

The first embodiment, or sample Nos. 4 to 27 of the second embodiment were high in insulation property such that the short-circuiting occurrence rate was not more than 12% and the break down voltage (BDV) was not less than 850 V. In particular, sample Nos. 5 to 7 in which (d2/d1) was in a range of 0.1 to 0.3 in the first embodiment and sample Nos. 11 to 13, 16 to 18, 21, 22, 25 and 26 in which the parameter P related to the shape of the transverse cross section of the core body was in a range of 0.8 to 1.2 and t1/d2 was in a range of 0.2 to 0.3 in the second embodiment were high in insulation property such that the short-circuiting occurrence rate was not more than 6% and the BDV was not less than 1050 V.

REFERENCE SIGNS LIST 1a, 1b: Dielectric film
2a, 2b: Electrode film
3a, 3b: Metalized film
4: Core body
5: Body
6a: First terminal electrode
6b: Second terminal electrode
7: Outer periphery of core body
7a: Long side of outer periphery of core body
7b: Short side of outer periphery of core body
8: Inner periphery of core body
9: Slit
10: Insulating member
11: Opening
12: Bulging portion

The invention claimed is:
1. A film capacitor, comprising:
a body including a core body formed of an insulating material and a metalized film which is wound around the core body, wherein a cross section perpendicular to an axial direction of the core body has an oval outer periphery with a major axis and a minor axis; and
first and second terminal electrodes disposed on both end surfaces in an axial direction of the body, respectively;
a slit extending along the major axis, wherein the slit is a gap formed along the minor axis between adjoining parts of an inner periphery of the core body; and
bulging portions formed at two ends of the slit, respectively, in a direction of the major axis, wherein a thickness of the gap formed along the minor axis is greatest in the bulging portions.
2. The film capacitor according to claim 1, wherein the core body is configured so that a thickness t1 in a direction of the major axis is smaller than a thickness t2 in a direction of the minor axis.
3. The film capacitor according to claim 1, wherein the respective bulging portions each have a teardrop shape which ends with an arc in the direction of the major axis, on the cross section.
4. The film capacitor according to claim 1, comprising an insulating member disposed in at least part of each of the bulging portions in the axial direction of the core body.
5. The film capacitor according to claim 1, wherein parts of the inner periphery opposing each other in a direction of the minor axis at least partially abut on each other in the axial direction.
6. The film capacitor according to claim 1, both end portions of the core body in the axial direction are provided with openings defined by the slit.
7. The film capacitor according to claim 1, wherein a ratio d2/d1 of d2 to d1 is 0.05 to 0.5, in which d1 denotes a length of the major axis and d2 denotes a length of the minor axis.
8. The film capacitor according to claim 1, wherein the oval outer periphery has a pair of straight portions extending along the major axis and a pair of arc portions connecting the pair of straight portions.
9. The film capacitor according to claim 8,
wherein on the cross section, a value P expressed as P=(L2/L1)×(L0/(π·2)−1) is in a range of 0.8 to 1.2, in which L0 denotes a length of the oval outer periphery, L1 denotes a length of the straight portions, L2 denotes a length of the arc portions, and d2 denotes a length of the minor axis.
10. A combination type capacitor, comprising:
a plurality of the film capacitors according to claim 1; and
at least one bus bar connecting all of the plurality of film capacitors.
11. An inverter, comprising:
a bridge circuit including switching elements; and
a capacitance member connected to the bridge circuit,
the capacitance member including the combination type capacitor according to claim 10.
12. An electric vehicle, comprising:
a power source;
the inverter according to claim 11, the inverter being connected to the power source;
a motor connected to the inverter; and
a wheel driven by the motor.

13. An inverter, comprising:
a bridge circuit including switching elements; and
a capacitance member connected to the bridge circuit,
the capacitance member including the film capacitor according to claim 1.

14. An electric vehicle, comprising:
a power source;
the inverter according to claim 13, the inverter being connected to the power source;
a motor connected to the inverter; and
a wheel driven by the motor.

15. A film capacitor, comprising:
a body including a core body formed of an insulating material and a metalized film which is wound around the core body; and
first and second terminal electrodes disposed on both end surfaces in an axial direction of the body, respectively,
a cross section perpendicular to an axial direction of the core body having an oval outer periphery having a major axis and a minor axis, and an inner periphery defining a slit extending along the major axis,
wherein the oval outer periphery has a pair of straight portions extending along the major axis and a pair of arc portions connecting the pair of straight portions, and
on the cross section, a ratio $t2/d2$ of a thickness $t2$ at the arc portions of the core body to a length $d2$ of the minor axis is in a range of 0.2 to 0.3.

\* \* \* \* \*